United States Patent
Gupta et al.

(10) Patent No.: US 11,675,599 B2
(45) Date of Patent: Jun. 13, 2023

(54) SYSTEMS AND METHODS FOR MANAGING SYSTEM ROLLUP OF ACCELERATOR HEALTH

(71) Applicant: Dell Products L.P., Round Rock, TX (US)

(72) Inventors: Chitrak Gupta, Bangalore (IN); Rama Rao Bisa, Bangalore (IN); John R. Palmer, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/984,726

(22) Filed: Aug. 4, 2020

(65) Prior Publication Data

US 2022/0043658 A1 Feb. 10, 2022

(51) Int. Cl.
*G06F 1/20* (2006.01)
*G06F 11/34* (2006.01)
*G06F 9/38* (2018.01)
*G06F 13/20* (2006.01)
*G06F 9/4401* (2018.01)

(52) U.S. Cl.
CPC .......... *G06F 9/3877* (2013.01); *G06F 9/4411* (2013.01); *G06F 13/20* (2013.01)

(58) Field of Classification Search
None
See application file for complete search history.

(56) References Cited

U.S. PATENT DOCUMENTS

| | | | | |
|---|---|---|---|---|
| 4,338,675 A * | 7/1982 | Palmer | ..................... | G06F 5/012 708/496 |
| 6,199,126 B1 * | 3/2001 | Auerbach | ........... | G06F 9/30178 712/E9.055 |
| 8,041,468 B2 * | 10/2011 | Olarig | ..................... | G06F 1/206 713/340 |
| 2005/0228927 A1 * | 10/2005 | Garcia | ................... | G06F 13/364 710/305 |
| 2007/0168498 A1 * | 7/2007 | Lambert | ............... | H04L 41/344 709/224 |
| 2007/0180328 A1 * | 8/2007 | Cornwell | ................ | G11C 29/56 714/E11.038 |
| 2012/0240185 A1 * | 9/2012 | Kapoor | ............... | H04L 41/0866 726/1 |
| 2016/0037686 A1 * | 2/2016 | Shabbir | ................... | G06F 1/206 700/300 |
| 2017/0262953 A1 * | 9/2017 | Ragupathi | ................. | G06T 1/20 |
| 2017/0371756 A1 * | 12/2017 | Hanson | ............... | G06F 11/3013 |
| 2019/0101969 A1 * | 4/2019 | Gendler | .................. | G06F 1/324 |

(Continued)

*Primary Examiner* — Hyun Nam
(74) *Attorney, Agent, or Firm* — Jackson Walker L.L.P.

(57) ABSTRACT

An information handling system may include a processor, one or more accelerators communicatively coupled to the processor, and a management controller communicatively coupled to the processor and the one or more accelerators and configured for out-of-band management of the information handling system, the management controller further configured to receive information regarding the one or more accelerators, determine a criticality factor for each of the one or more accelerators based on the information, determine an accelerator health status for each of the one or more accelerators, and determine an overall system health of the information handling system based on the criticality factors and the accelerator health statuses.

15 Claims, 3 Drawing Sheets

(56) References Cited

U.S. PATENT DOCUMENTS

| | | | |
|---|---|---|---|
| 2019/0235890 A1* | 8/2019 | Schnoor | G06F 13/4068 |
| 2020/0349098 A1* | 11/2020 | Caulfield | G06F 9/505 |
| 2020/0409813 A1* | 12/2020 | Gupta | G06F 11/3409 |
| 2021/0064110 A1* | 3/2021 | Gendler | G06F 1/3296 |
| 2023/0042405 A1* | 2/2023 | Babiarz | C12Q 1/6886 |

* cited by examiner

SYSTEMS AND METHODS FOR MANAGING SYSTEM ROLLUP OF ACCELERATOR HEALTH

TECHNICAL FIELD

The present disclosure relates in general to information handling systems, and more particularly to methods and systems for managing system rollup of accelerator health in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In traditional approaches, a management controller may monitor health of accelerator devices over a communications sideband. The management controller may further "rollup" the health status of accelerator devices to determine an overall health status of an information handling system. However, criticality of health of an accelerator device may be contextual, but existing approaches may not take into account such context. Accordingly, the rolled-up overall health status of an information handling system may indicate critical system health due to an unused accelerator with degraded health.

SUMMARY

In accordance with the teachings of the present disclosure, the disadvantages and problems associated with existing approaches to determine overall system health may be reduced or eliminated.

In accordance with embodiments of the present disclosure, an information handling system may include a processor, one or more accelerators communicatively coupled to the processor, and a management controller communicatively coupled to the processor and the one or more accelerators and configured for out-of-band management of the information handling system, the management controller further configured to receive information regarding the one or more accelerators, determine a criticality factor for each of the one or more accelerators based on the information, determine an accelerator health status for each of the one or more accelerators, and determine an overall system health of the information handling system based on the criticality factors and the accelerator health statuses.

In accordance with these and other embodiments of the present disclosure, a management controller configured to communicatively couple to a processor and one or more accelerators, configured for out-of-band management of an information handling system, and further configured to receive information regarding the one or more accelerators, determine a criticality factor for each of the one or more accelerators based on the information, determine an accelerator health status for each of the one or more accelerators, and determine an overall system health of the information handling system based on the criticality factors and the accelerator health statuses.

In accordance with these and other embodiments of the present disclosure, a method may include, in an information handling system comprising a processor, one or more accelerators communicatively coupled to the processor, and a management controller communicatively coupled to the processor and the one or more accelerators and configured for out-of-band management of the information handling system: receiving, by the management controller, information regarding the one or more accelerators; determining, by the management controller, a criticality factor for each of the one or more accelerators based on the information; determining, by the management controller, an accelerator health status for each of the one or more accelerators; and determining, by the management controller, an overall system health of the information handling system based on the criticality factors and the accelerator health statuses.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
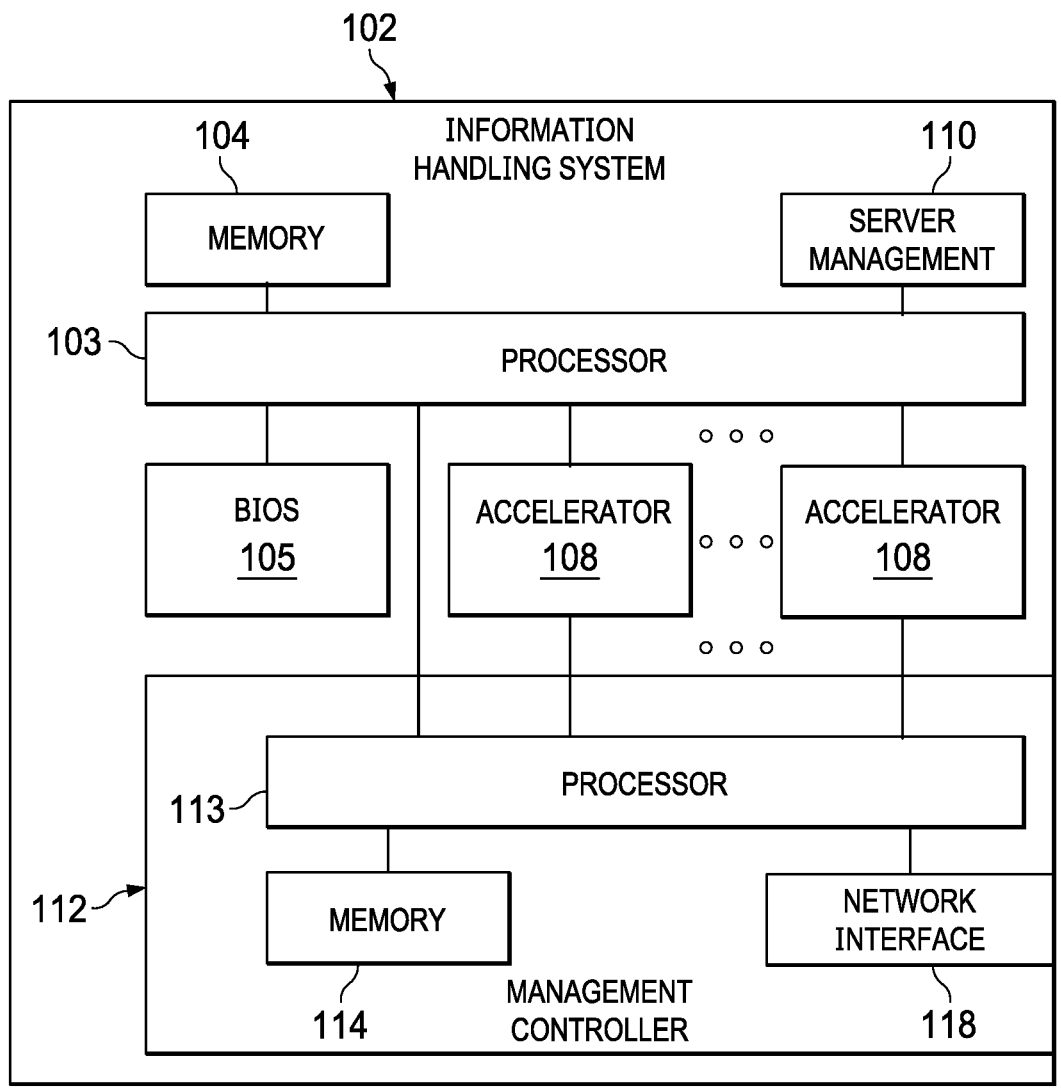
FIG. 1 illustrates a block diagram of an example information handling system, in accordance with embodiments of the present disclosure.
Figure 2:
FIG. 2 illustrates an example data matrix, in accordance with embodiments of the present disclosure.
Figure 3:
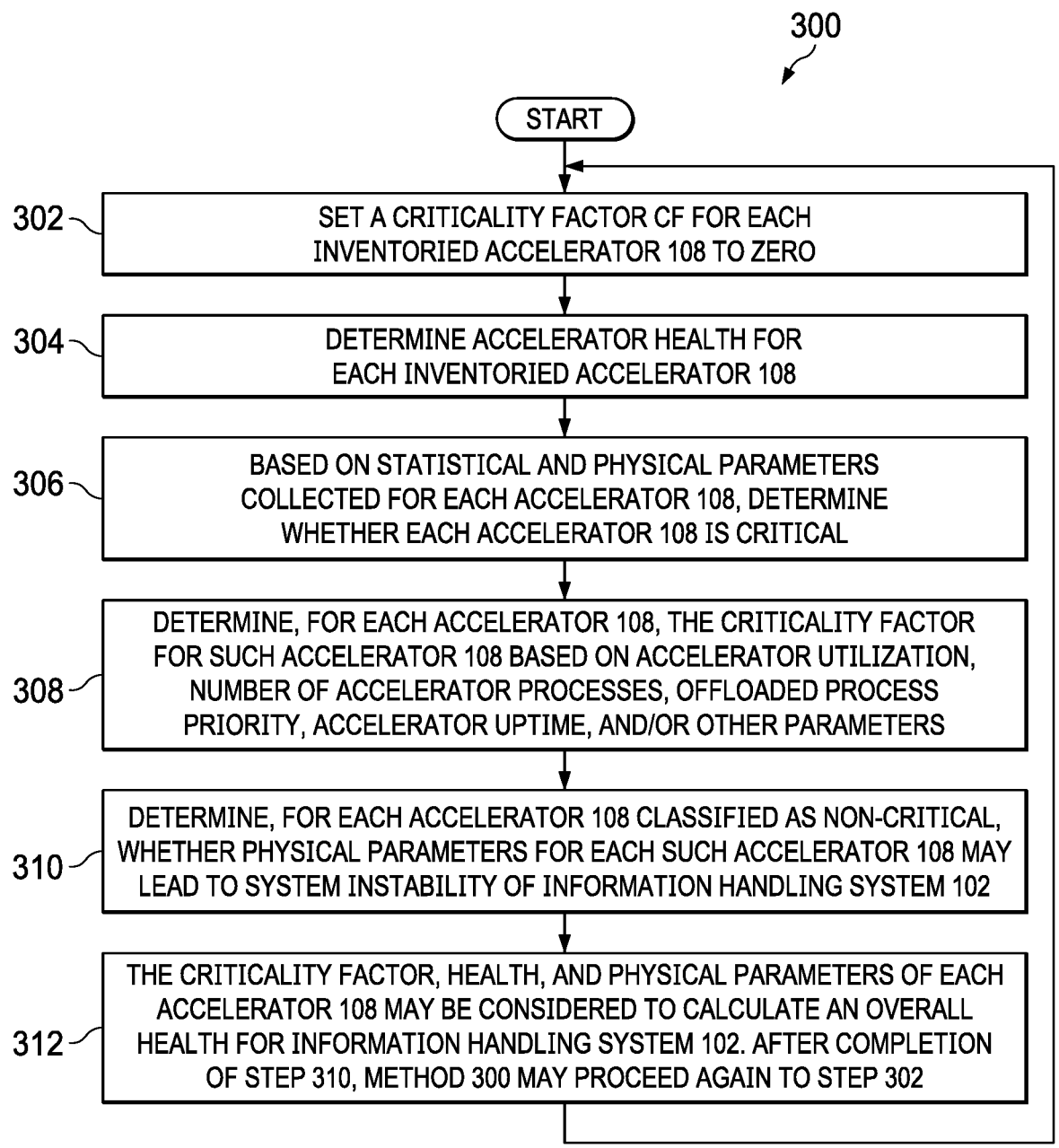
FIG. 3 illustrates a flow chart of an example method for rolling up overall system health based on statistical and physical parameters of accelerators, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output (BIOS) system 105 communicatively coupled to processor 103, a server management module 110 communicatively coupled to processor 103, a management controller 112 communicatively coupled to processor 103, and one or more accelerators 108 communicatively coupled to management controller 112 and processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Server management module 110 may be communicatively coupled to processor 103 and may include any system, device, or apparatus configured to provide real-time monitoring and alerting for server hardware components. Server management module 110 may broadly refer to any system, device, or apparatus configured to perform such functionality, including without limitation, Intel Server Management software. In some embodiments, server management module 110 may be implemented as a program of instructions that may be read by and executed on processor 103 to carry out the functionality of server management module 110.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

Network interface 118 may comprise any suitable system, apparatus, or device operable to serve as an interface between management controller 112 and/or one or more other information handling systems. Network interface 118 may enable management controller 112 to communicate using any suitable transmission protocol and/or standard. In these and other embodiments, network interface 118 may comprise a network interface card, or "NIC."

An accelerator 108 may include any suitable hardware for accelerating processing of data and/or instructions, and may include a graphics processing unit, field programmable gate array, I/O accelerator, or any other suitable accelerator device. Accelerators 108 may be communicatively coupled to management controller 112 via a sideband interface (e.g., Peripheral Component Interconnect Express (PCIe), Inter-Integrated Circuit (I2C), etc.).

In addition to processor 103, memory 104, BIOS 105, server management module 110, management controller 112, and accelerator(s) 108, information handling system 102 may include one or more other information handling resources.

In operation, management controller 112 may communicate with accelerators 108 via a sideband interface, either via standard commands or proprietary protocols, to collect statistical information from accelerators 108, including parameters including but not limited to utilization, health, offload percentage, accelerator thermal state, page retirement statistics, driver loading state, and/or others. Management controller 112 may use this statistical information about accelerators 108 to determine, for each accelerator 108, a criticality factor used by management controller 112 to rollup the overall system health of information handling system 102.

In addition, accelerators 108 may not be capable of communicating certain physical parameters to management controller 112. Thus, BIOS 105 and/or server management module 110 may determine such physical parameters. Examples of such physical parameters may include cabling issues, bus/communication issues, thermal throttling, and/or other physical parameters.

To perform such functionality, management controller 112 may collect an inventory of all accelerators 108 in information handling system 102, and create and populate a data matrix for accelerators 108 based on statistical and physical parameters collected from accelerators 108, BIOS 105, and server management module 110. An example of such a data matrix 200 is set forth in FIG. 2.

As shown in FIG. 2, example data matrix 200 may set forth for each accelerator 108 information including accelerator utilization percentage, number of processes executing on such accelerator 108, a processor priority mean for such accelerator, and an uptime for such accelerator 108. The data sets shown in FIG. 2 may be exemplary, and some embodiments may use other system parameters including power metrics, clock metrics, and other metrics.

FIG. 3 illustrates a flow chart of an example method 300 for rolling up overall system health based on statistical and physical parameters of accelerators 108, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, management controller 112 may set a criticality factor CF for each inventoried accelerator 108 to zero. At step 304, management controller 112 may determine accelerator health for each accelerator 108. Accelerator health may be determined in any manner, including without limitation using approaches similar or identical to those disclosed in U.S. patent application Ser. No. 16/453,025 filed Jun. 26, 2019, and incorporated by reference herein in its entirety.

At step 306, based on statistical and physical parameters collected for each accelerator 108, management controller 112 may, for each accelerator 108, determine whether the accelerator 108 is critical (e.g., using a regression model or other approach). In some instances, management controller 112 may only determine whether an accelerator 108 is critical if such accelerator 108 is determined to be unhealthy.

At step 308, management controller 112 may determine, for each accelerator 108, the criticality factor for such accelerator 108 based on accelerator utilization, number of accelerator processes, offloaded process priority, accelerator uptime, and/or other parameters.

At step 310, for each accelerator 108 classified as non-critical, physical parameters for each such accelerator 108 may be checked to determine situations that may lead to system instability of information handling system 102.

At step 312, the criticality factor, health, and physical parameters of each accelerator 108 may be considered to calculate an overall health for information handling system 102. After completion of step 312, method 300 may proceed again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Although the foregoing contemplates collection of accelerator information and determinations of accelerator criticality within an information handling system to determine overall system health for the information handling system, in some embodiments, accelerator information and determinations of accelerator criticality may be made across multiple information handling systems in a logical or physical cluster, to determine an overall health of the cluster.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   one or more accelerators communicatively coupled to the processor; and
   a baseboard management controller (BMC) communicatively coupled to the processor and the one or more accelerators and configured for out-of-band management of the information handling system, the BMC further configured to:
      receive statistical information regarding the one or more accelerators wherein the statistical information comprises, for each of the one or more accelerators, information indicative of one or more of: utilization of such accelerator, number of processes executed by such accelerator, page retirement statistics of such accelerator, uptime of such accelerator, and driver loading state of such accelerator;
      determine a criticality factor for each of the one or more accelerators based on the statistical information;
      determine an accelerator health status for each of the one or more accelerators; and
      determine an overall system health of the statistical information handling system based on the criticality factors and the accelerator health statuses.

2. The information handling system of claim 1, wherein the statistical information comprises physical information regarding the one or more accelerators.

3. The information handling system of claim 2, wherein the physical information comprises, for each of the one or more accelerators, one or more of cabling issues associated with such accelerator and bus or communication issues associated with such accelerator.

4. The information handling system of claim 1, wherein the BMC is further configured to receive the statistical information regarding the one or more accelerators from the one or more accelerators.

5. The information handling system of claim 4, wherein the BMC is further configured to receive the statistical information regarding the one or more accelerators from at least one of a basic input/output system and a server management module executing on the processor.

6. A baseboard management controller (BMC) configured to communicatively couple to a processor and one or more accelerators, configured for out-of-band management of an information handling system, and further configured to:
   receive statistical information regarding the one or more accelerators wherein the statistical information comprises, for each of the one or more accelerators, one or more of: utilization of such accelerator, number of processes executed by such accelerator, page retirement statistics of such accelerator, uptime of such accelerator, and driver loading state of such accelerator;
   determine a criticality factor for each of the one or more accelerators based on the statistical information;
   determine an accelerator health status for each of the one or more accelerators; and
   determine an overall system health of the statistical information handling system based on the criticality factors and the accelerator health statuses.

7. The BMC of claim 6, wherein the statistical information comprises physical information regarding the one or more accelerators.

8. The BMC of claim 7, wherein the physical information comprises, for each of the one or more accelerators, one or more of cabling issues associated with such accelerator and bus or communication issues associated with such accelerator.

9. The BMC of claim 6, further configured to receive the statistical information regarding the one or more accelerators from the one or more accelerators.

10. The BMC of claim 9, further configured to receive the statistical information regarding the one or more accelerators from at least one of a basic input/output system and a server management module executing on the processor.

11. A method comprising, in an information handling system comprising a processor, one or more accelerators communicatively coupled to the processor, and a baseboard management controller (BMC) communicatively coupled to the processor and the one or more accelerators and configured for out-of-band management of the information handling system:
- receiving, by the BMC, statistical information regarding the one or more accelerators wherein the statistical information comprises, for each of the one or more accelerators, one or more of: utilization of such accelerator, number of processes executed by such accelerator, page retirement statistics of such accelerator, uptime of such accelerator, and driver loading state of such accelerator;
- determining, by the BMC, a criticality factor for each of the one or more accelerators based on the statistical information;
- determining, by the BMC, an accelerator health status for each of the one or more accelerators; and
- determining, by the BMC, an overall system health of the statistical information handling system based on the criticality factors and the accelerator health statuses.

12. The method of claim 11, wherein the statistical information comprises physical information regarding the one or more accelerators.

13. The method of claim 12, wherein the physical information comprises, for each of the one or more accelerators, one or more of cabling issues associated with such accelerator and bus or communication issues associated with such accelerator.

14. The method of claim 11, wherein receiving the statistical information comprises receiving the statistical information regarding the one or more accelerators from the one or more accelerators.

15. The method of claim 9, wherein receiving the statistical information comprises receiving the statistical information regarding the one or more accelerators from at least one of a basic input/output system and a server management module executing on the processor.

* * * * *